Patented Sept. 26, 1939

2,174,449

UNITED STATES PATENT OFFICE 2,174,449

COMBINATION OF ELECTRIC DISCHARGE DEVICES WITH MATERIALS EXCITED TO LUMINESCENCE BY THE DISCHARGE THROUGH THEM

John Turton Randall, Birmingham, England, assignor to General Electric Company, a corporation of New York No Drawing. Application May 11, 1938, Serial No. 207,403. In Great Britain May 10, 1937

1 Claim. (Cl. 176—122)

This invention relates to sources of light of the type comprising a high-pressure metal-vapour electric discharge (HPMV) lamp and material adapted to be excited to luminescence by the radiation from the said lamp when it is in operation.

In sources of this type part at least of the material is usually adapted to emit red light in which the HPMV lamp is deficient. It is explained in British patent specification No. 431,409 that, for the proper rendering of flesh tints, the light from an HPMV lamp is also deficient in blue; it is proposed (inter alia) to supply this deficiency by using as part of the said material a material that emits blue luminescent light. There is sometimes a further reason for using a material luminescing blue. Zinc-cadmium sulphide activated by copper, which is often used for supplying red light, absorbs blue light; accordingly, if the correct rendering of flesh tints is not important, it may be desirable to use a material luminescing blue in order to restore the absorbed blue light without increasing the blue content of the light above that characteristic of the HPMV lamp alone.

At the date of the said application, and for some time afterwards, the envelope surrounding the discharge in a commercial HPMV lamp was usually of glass which transmitted practically no radiation of wave-length less than 3,000 A. U. and very little of wave-length less than 3,300 A. U. Few inorganic luminescent materials are excited efficiently by radiation of wave-length longer than 4,000 A. U.; accordingly, if such materials were to be employed (as is most convenient) and if they were to be placed outside the discharge envelope (as is necessary), the choice of materials was limited to those excited efficiently by radiation emitted powerfully by the mercury discharge between 4,000 and 3,300 A. U., which means the group of lines about 3,650 A. U. If two luminescent materials were used, both had to be excited by the same primary radiation.

But nowadays HPMV lamps with quartz envelopes are available; quartz transmits radiation down to 2,200 A. U. Accordingly a new range of radiation is available for exciting luminescence, including the powerful lines of wave-length less than 3,000 A. U. It is no longer necessary that all the luminescent substances should be excited by the same primary radiation; if it is unnecessary, it is undesirable; more luminescent light can be obtained if they are excited by different radiations.

One obvious plan would be to excite the luminescent light of one colour by one range of primary wave-length and the luminescent light of another colour by another range. But this appears not always to be the best plan; it is better to excite light of one colour (and especially red) in two or more luminescent materials excited by different primary radiations. Since two luminescent materials seldom, if ever, emit light of the same hue, it is to be understood that here "of one colour" does not mean necessarily of exactly the same hue. All oranges and reds are to be regarded as of one colour, namely red and all blue-greens and blues as of one colour, namely blue.

According to the invention in a source of light of the type specified the HPMV lamp has a quartz envelope and the said material contains at least three components namely one adapted to emit red luminescent light under excitation by radiation in the range 4,000–3,000 A. U., one adapted to emit red luminescent light under excitation by radiation in the range 3,000–2,200 A. U., and one adapted to emit blue luminescent light under excitation within the range 4,000–2,200 A. U.

In view of the possible development of highly refractory glasses transmitting highly in the ultra-violet, "quartz" in the foregoing statement and the appended claims is to be interpreted to mean any vitreous material not substantially less refractory than vitreous silica and not substantially less transparent to radiation in the range 7,000–2,200 A. U. A material is to be considered to be adapted to be excited by radiation in the range $x$, when, of all radiations in the range 7,000–2,200 A. U., that which excites it most efficiently lies in the range $x$.

A suitable material for the first said component is zinc-cadmium sulphide containing 20–40% of cadmium sulphide activated by copper; for the second said component cadmium silicate or zinc-beryllium silicate both activated by manganese; for the third zinc sulphide activated by silver or calcium tungstate which may be, but need not be, activated by 2 to 4% of lead. No novelty is claimed for the use of any of these materials alone. Each of the components preferably constitutes between 25 and 50% of the total luminescent material.

The luminescent material is preferably on the interior surface of the jacket surrounding the quartz envelope; the space between the jacket and the envelope may then be filled with oxygen, which may be mixed with helium, at a pressure below atmospheric. Such a filling prevents chemical change and consequent deterioration of the luminescent material. But if the jacket is transparent to sufficiently short wave-lengths, the luminescent material may be outside the jacket.

The red content of the source may be increased in known manner by adding cadmium and/or zinc to the mercury in the HPMV lamp.

Having now particularly described and ascertained the nature of my said invention and in what manner the same is to be performed, I declare that what I claim is:

A source of light comprising in combination a high-pressure mercury-vapor electric discharge lamp having a quartz envelope, and luminescent material associated therewith and exposed to the radiations from said lamp, said luminescent material containing three different components, one component comprising a fluorescent zinc-cadmium sulphide containing 20–40% of cadmium sulphide activated by copper, another of said components comprising a fluorescent material of the group comprising cadmium silicate activated by manganese and zinc-beryllium silicate activated by manganese, and a third component which emits blue luminescent light upon excitation by radiations from said lamp in the range of 4000–2200 A. U.

JOHN TURTON RANDALL.